United States Patent [19]
Michaelis et al.

[11] Patent Number: 5,350,262
[45] Date of Patent: Sep. 27, 1994

[54] DOOR SEAL MACHINING DEVICE

[75] Inventors: Ronald E. Michaelis, Martinsville; Oscar F. Selburg, Beech Grove, both of Ind.

[73] Assignee: Citizens Gas & Coke Utility, Indianapolis, Ind.

[21] Appl. No.: 17,694

[22] Filed: Feb. 12, 1993

[51] Int. Cl.$^5$ .............................................. B23C 1/20
[52] U.S. Cl. ..................... 409/178; 15/93.2; 409/175; 409/202
[58] Field of Search ............... 409/178, 194, 175, 235, 409/202, 212; 15/93.2; 29/33 R; 51/35

[56] References Cited

U.S. PATENT DOCUMENTS

| | | | |
|---|---|---|---|
| 1,916,021 | 6/1933 | Sherrill et al. | 15/93.2 |
| 2,986,758 | 6/1961 | Randell et al. | 15/93.2 |
| 3,115,655 | 12/1963 | Bowman | 15/93.2 |
| 3,146,475 | 9/1964 | Balitsky et al. | 15/93.2 |
| 3,220,038 | 11/1965 | Balitsky et al. | 15/93.2 |
| 3,448,475 | 6/1969 | Stanke | 15/93.2 |
| 3,526,013 | 9/1970 | Kato | 15/93.2 |
| 3,557,659 | 1/1971 | Harris | 409/178 |
| 3,587,389 | 6/1971 | Kreimer | 409/204 |
| 3,611,466 | 10/1971 | McCullough | 409/178 X |
| 3,633,232 | 1/1972 | McCullough et al. | 15/93.2 |
| 3,660,859 | 5/1972 | McCullough | 15/93.2 |
| 3,680,438 | 8/1972 | Good et al. | 409/235 |
| 3,687,007 | 8/1972 | Harris | 409/178 |
| 4,102,245 | 7/1978 | Cousins | 409/194 |
| 4,165,261 | 8/1979 | Henstra et al. | 15/93.2 |
| 4,229,866 | 10/1980 | Berthier | 409/235 |
| 4,300,257 | 11/1981 | Ibe et al. | 15/93.2 |
| 4,340,987 | 7/1982 | Gregor et al. | 15/93.2 |
| 4,375,389 | 3/1983 | Lindgren | 15/93.2 |

*Primary Examiner*—William Briggs
*Attorney, Agent, or Firm*—Barnes & Thornburg

[57] ABSTRACT

A device for preparing a coke oven door includes a frame for securing the door in a working position. A milling machine for machining the door seal includes a gantry coupled to the frame and a milling head coupled to the gantry. The milling head is movable up and down, longitudinally, and transversely relative to the door so as to maintain contact with the door seal. According to one aspect of the invention, a rail is attached to the frame and a rail extension is attached to the gantry. The rail and rail extension cooperate to guide the gantry longitudinally along the door. A rack is attached to the frame and a driven pinion is attached to the milling machine which engages the rack to move the milling machine along the rail and rail extension.

6 Claims, 6 Drawing Sheets

DOOR SEAL MACHINING DEVICE

BACKGROUND AND SUMMARY OF THE INVENTION

The present invention relates to devices for preparing coke oven doors, and particularly to descaling machines for removing deposits from the oven door refractory and milling machines for machining the oven door seal. More particularly, the invention relates to descaling machines and milling machines that are coupled to a frame which securely supports the coke oven door for maintenance purposes.

Ovens used in the production of coke generally comprise four walls which together define a long narrow internal channel therebetween. The ends of the channel are closed by removable oven doors. Typically, a coke production facility has an apparatus for removing the doors from the oven at the end of a production cycle to facilitate the removal of coke from the oven. The apparatus is generally capable of replacing the door on the oven or transferring the door to a support frame in a maintenance area.

A coke oven door generally has a door frame and a center portion of refractory material attached to the door frame which juts into the coke oven when the door is installed on the oven. A sealing strip extends around the perimeter of the door frame and presents a knife edge to a face of the door jamb. A good seal improves the efficiency of the coke oven by reducing the escape of heat past the door and reduces the hazards associated with such heat loss.

It is well known that, in order to be effective, the seal between the coke oven door and the door jamb must be gas tight. If the knife edge exactly mates with the door jamb, the knife edge will provide a gas tight seal around the door.

During the coking operation, a large amount of tar, coke, or the like deposit on the center portion and seal of the door. Cleaning the deposits from the coke oven door and seal improves the thermal efficiency of the oven and helps to ensure that the door will seat properly to provide a good seal when the door is replaced on the oven. Thus, it is necessary to clean the deposits from the door refractory and door seal at regular intervals. Ideally, the coke oven door is cleaned at the end of each cycle, when the coke oven door is removed and the coke is removed from the oven.

If any gaps exist between the knife edge and the door jamb, the tar, coke or the like will also deposit on the knife edge at the gaps, and the knife edge will also need cleaning. However, with regard to gaps between the knife and the door jamb, cleaning is not enough. In addition to fostering the formation of deposits on the knife edge, gaps between the knife edge and the door jamb accelerate wear and warpage of the knife edge by the passage of hot gases escaping from the oven at the gaps. Thus, gaps can tend to grow over time and get worse. Therefore, it is advantageous to resurface the door seal at regular intervals to ensure that the knife edge is true and thereby reduce the effect of wear and warpage of the knife edge due to heat escaping from the coke oven.

Typically, when the coke oven doer is removed from the oven for maintenance, it is moved to a maintenance area where it is mounted in a maintenance frame for cooling and subsequent cleaning and resurfacing. In the past, while the door was in the maintenance frame, the deposits were removed from the door by hand-held wire brushes. While in the maintenance frame, the door seal was also resurfaced manually by running a belt type sander over the door seal and visually inspecting the resurfaced sealing edge for trueness. The manual method of cleaning the deposits from the door has been adequate, but inefficient. Moreover, a visual inspection for trueness can prove to be inaccurate, causing problems with an improper fit when the oven door is replaced on the oven, leaving a gap between the knife edge and the door jamb. A device that would allow rapid removal of deposits from the door and seal and rapidly and accurately resurface the sealing edge of the door seal would be a substantial improvement over conventional door preparation mechanisms.

According to the present invention, a device for preparing a coke oven door includes a frame for securing the door in a working position. A milling machine for machining the door seal includes a gantry coupled to the frame and a milling head coupled to the gantry. The milling head is movable up and down, longitudinally, and transversely relative to the door so as to maintain contact with the door seal.

According to one aspect of the invention, a rail is attached to the frame and a rail extension is attached to the gantry. The rail and rail extension cooperate to guide the gantry longitudinally along the door. A rack is attached to the frame and a driven pinion is attached to the milling machine which engages the rack to move the milling machine along the rail and rail extension.

A descaling machine is movable longitudinally along the door and includes a plurality of brushes for removing deposits from the refractory and door frame. A U-shaped channel is attached to the frame for guiding the descaling machine along the door. The descaling machine includes a plurality of driven wheels for movement along the U-shaped channel.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
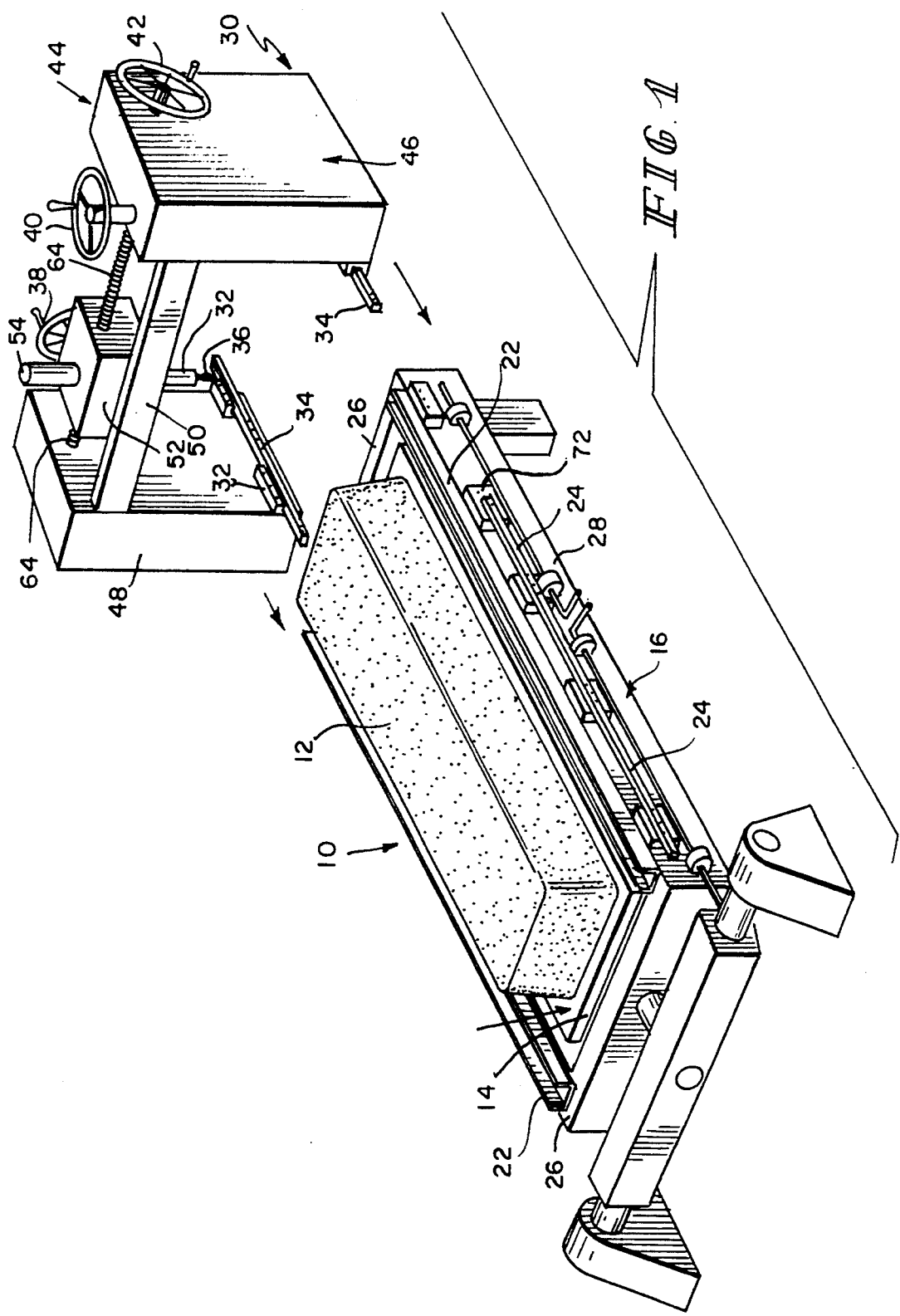
FIG. 1 is a perspective view of a coke oven door resting in a door frame with a milling machine in a preparatory position for coupling with the frame.
Figure 4:
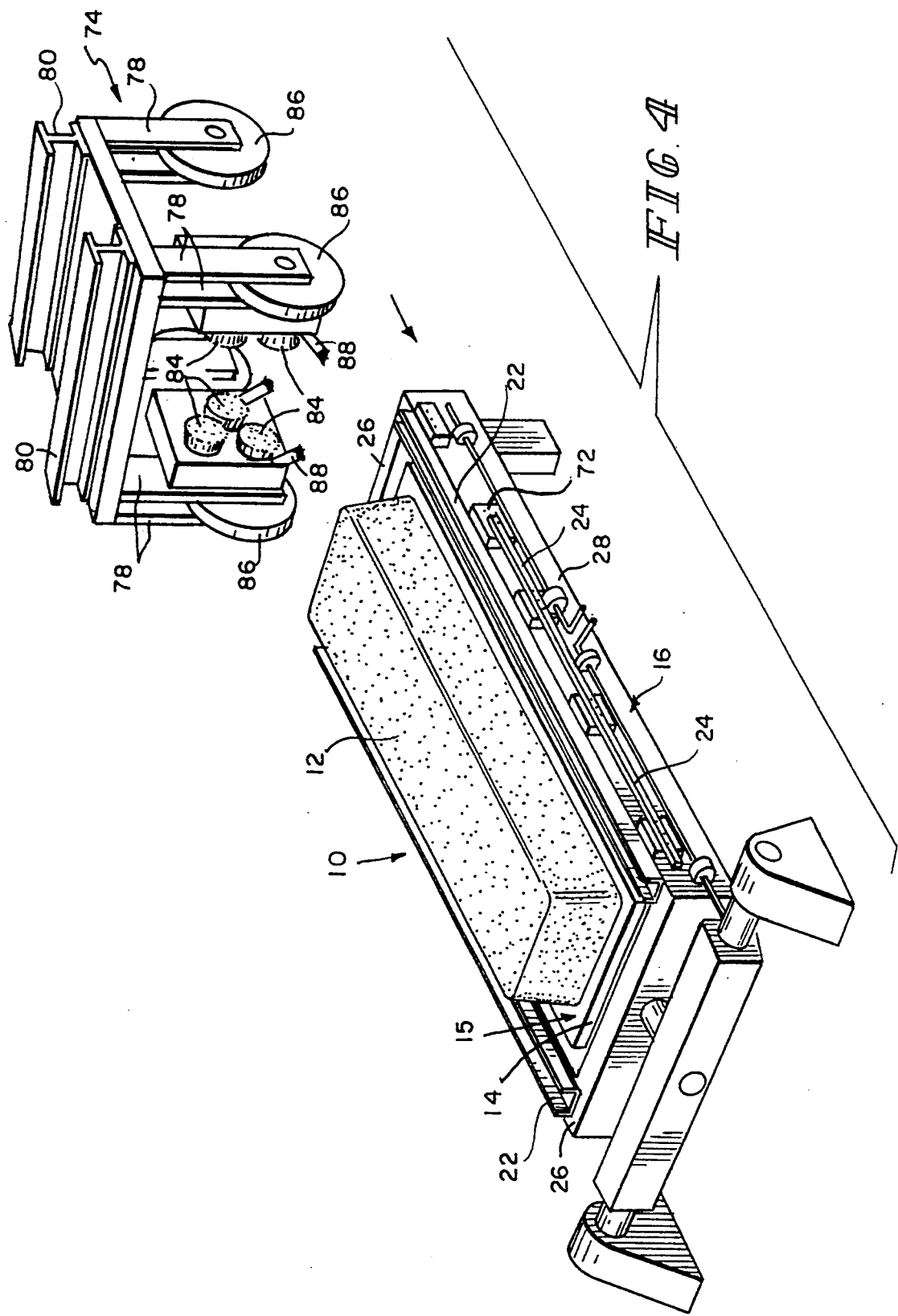
FIG. 4 is a perspective view similar to FIG. 1 showing the descaling machine positioned to engage the coke oven door.

A coke oven door 10, as shown in perspective in FIGS. 1 and 4, includes a refractory portion 12 and a door seal knife edge 14 attached to a door frame 15. The door 10 is positioned in a maintenance frame 16 so as to place the refractory portion 12 and the door seal knife edge 14 in position to be prepared.

The maintenance frame 16 has an upwardly facing surface 26 and a pair of parallel outboard surfaces 28 extending longitudinally along the maintenance frame 16 and perpendicular to the upwardly facing surface 26. A pair of channels 22, each having a U-shaped cross section, are attached to the upwardly facing surface 26. The channels 22 are positioned in parallel spaced-apart relation so as to extend along opposite sides of the door 10. A linear motion rail 24 is attached to each outboard longitudinal surface 28 of the maintenance frame 16 so as to be parallel to the upwardly facing surface 26.

As shown in FIG. 1, a milling machine 30 is positioned to be coupled to the maintenance frame 16. The milling machine 30 includes a plurality of linear bearings 32 adapted to move along linear motion rail extensions 34. When the milling machine 30 is properly aligned with the maintenance frame 16, the linear motion rail extensions 34 are positioned to be attached to the maintenance frame 16 in coaxial alignment with the linear motion rails 24. Thus, the milling machine 30 can travel the length of the maintenance frame 16 along the linear motion rails 24 and extensions 34.

The milling machine 30 includes a gantry 44 having two vertical members 46 and 48 and a pair of parallel horizontal tool bars 50 disposed between the first and second vertical members 46 and 48. A support cage 52 carries a machining tool 54 which drives a milling head 36. The machining tool 54 moves along the tool bars 50 and up and down relative to the tool bars 50 to allow the machining tool 54 to travel up and down relative to the knife edge 14 and transversely relative to the longitudinal axis of the door 10.

The milling machine 30 also includes three hand wheels for manually moving the milling head 36 to remove portions of the knife edge 14 as necessary to eliminate gaps between the knife edge 14 and the door jamb on the oven (not shown). A first hand wheel 38 raises and lowers the milling head 36 relative to the knife edge 14. The second hand wheel 40 moves the milling machine 30, and hence the milling head 36, parallel to the longitudinal axis of the door 10. The third hand wheel 42 moves the milling head 36 along the tool bars 50 transversely to the longitudinal axis of the door 10. Thus, the three hand wheels 38, 40, and 42 cooperate to move the milling head 36 in any desired direction to place and maintain the milling head 36 in contact with the knife edge 14.

Figure 2:
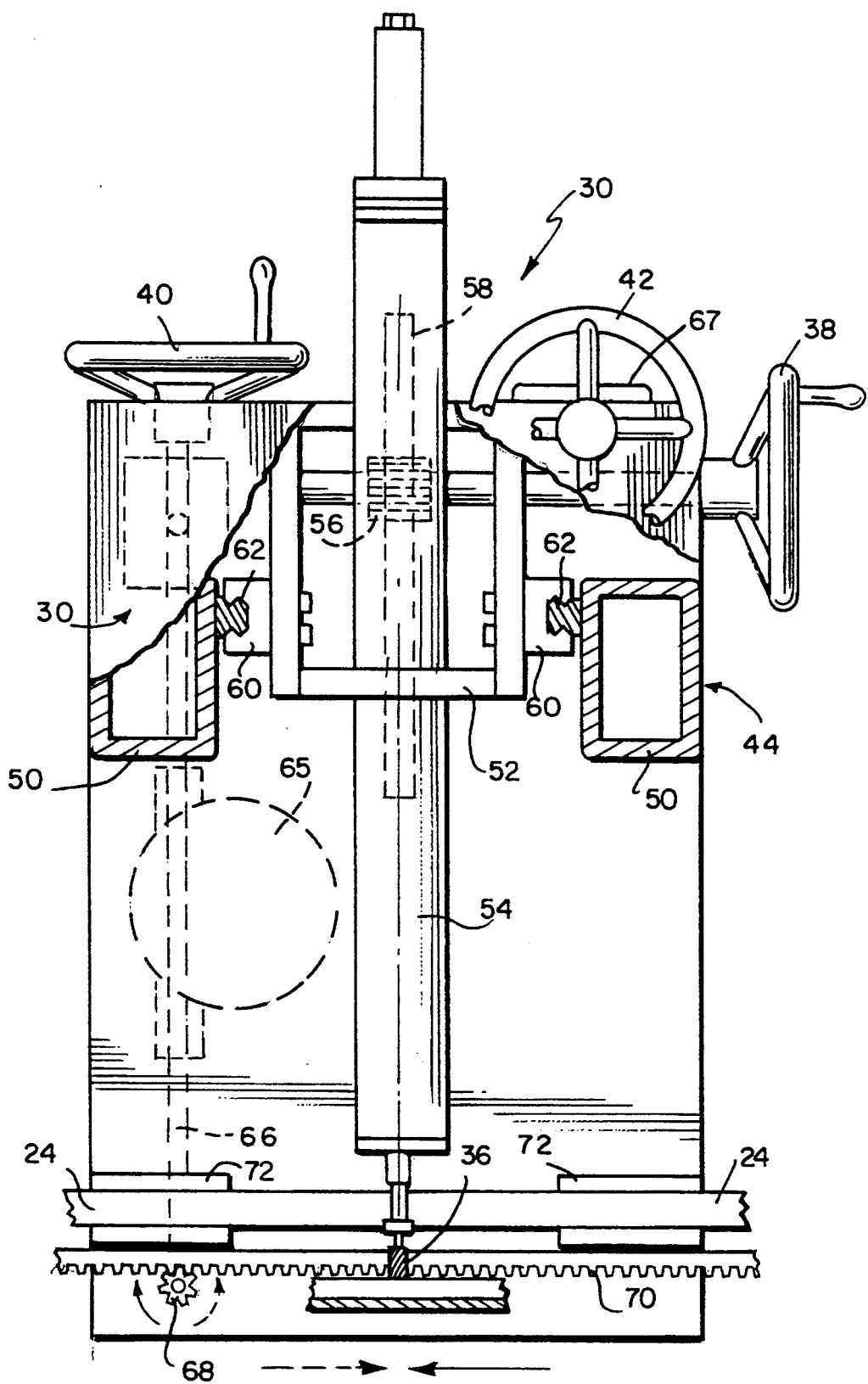
FIG. 2 is a side view of the milling machine as seen from the right in FIG. 1 when the milling machine is coupled to the frame.
Figure 3:
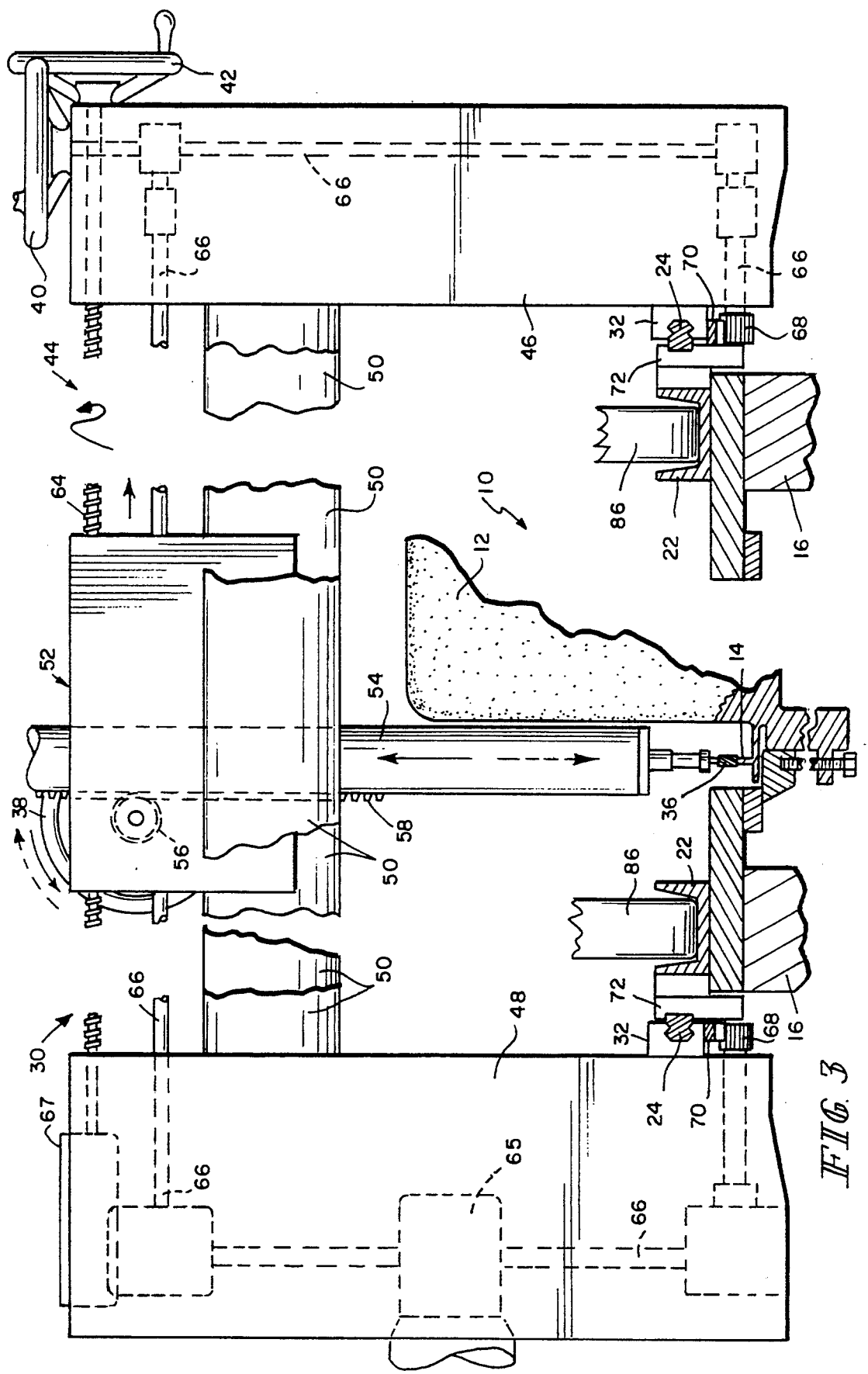
FIG. 3 is a broken view of the milling machine looking parallel to the longitudinal axis of the door, showing the relative position of the door, frame, and rails for guiding the milling machine along the door frame.

As illustrated in FIGS. 2 and 3, the up and down action of the machining tool 54 is accomplished by turning the first hand wheel 38. The first hand wheel 38 actuates a pinion 56 which causes a rack 58 coupled to the machining tool 54 to move up and down relative to the pinion.

Longitudinal motion of the machining tool 54 is accomplished by turning the second hand wheel 40 which is drivingly coupled to a pinion 68 by linkage 66 (in dotted lines). The pinion 68 engages a rack 70 which is coupled to a support plate 72 which in turn is coupled to the maintenance frame 16. Linear bearings 32 are attached to the first and second vertical members 46 and 48 of the gantry 44. The linear bearings 32 are positioned to slidingly engage the linear motion rails 24 which are attached to the support plate 72 when the pinion 68 engages the rack 70.

As shown in FIG. 2, the support cage 52 includes a plurality of linear bearings 60 adapted to ride along linear motion rails 62 coupled to the tool bar 50. Movement of the support cage 52 along the linear motion rails 62 moves the machining tool 54 transversely to the longitudinal axis of the door 10 and is accomplished by turning the third hand wheel 42. Turning the third hand wheel 42 actuates a worm gear 64 which engages a bearing block (not shown) in the support cage 52.

In addition to manual positioning of the machining tool 54 by use of the handles 38, 40, and 42, the machining tool 54 can also be moved by use of an air motor (not shown). The output shaft 65 of an air motor (not shown) can be coupled to the linkage 66 to drive the gantry longitudinally along the door 10. An additional air motor 67 can be coupled to the worm gear 64 to drive the support cage 52 transversely to the longitudinal axis of the door 10. A motor (not shown) can also be incorporated into the support cage to mechanically drive the machining tool 54 up and down relative to the door seal. It will therefore be appreciated that the milling head 36 can be positioned adjacent the door seal knife edge 14 at any point around the door 10 by use of the hand wheels 38, 40, 42 or the electric motors. In preferred embodiments, the motors would be pneumatic motors. However, any type of motor known to one of ordinary skill in the art may be used without departing from the scope of the invention.

As shown generally in FIG. 4, a descaling machine 74 includes a frame structure 76 having vertical support members 78 and horizontal support members 80. The frame structure 76 supports a plurality of brushes 84 and a plurality of rollers 86. As shown in more detail in FIGS. 5-6, the descaling machine 74 is operably positioned on the maintenance frame 16 so as to allow the rollers 86 to ride in the U-shaped channels 22. When the descaling machine 74 is thus positioned, the brushes 84 are in contact with the refractory 12 on the oven door 10. A corner brush 88 is positioned to clean the surface portion 90 of the door frame 15 extending between the knife edge 14 and the refractory 12 (FIG. 5).

Figure 5:
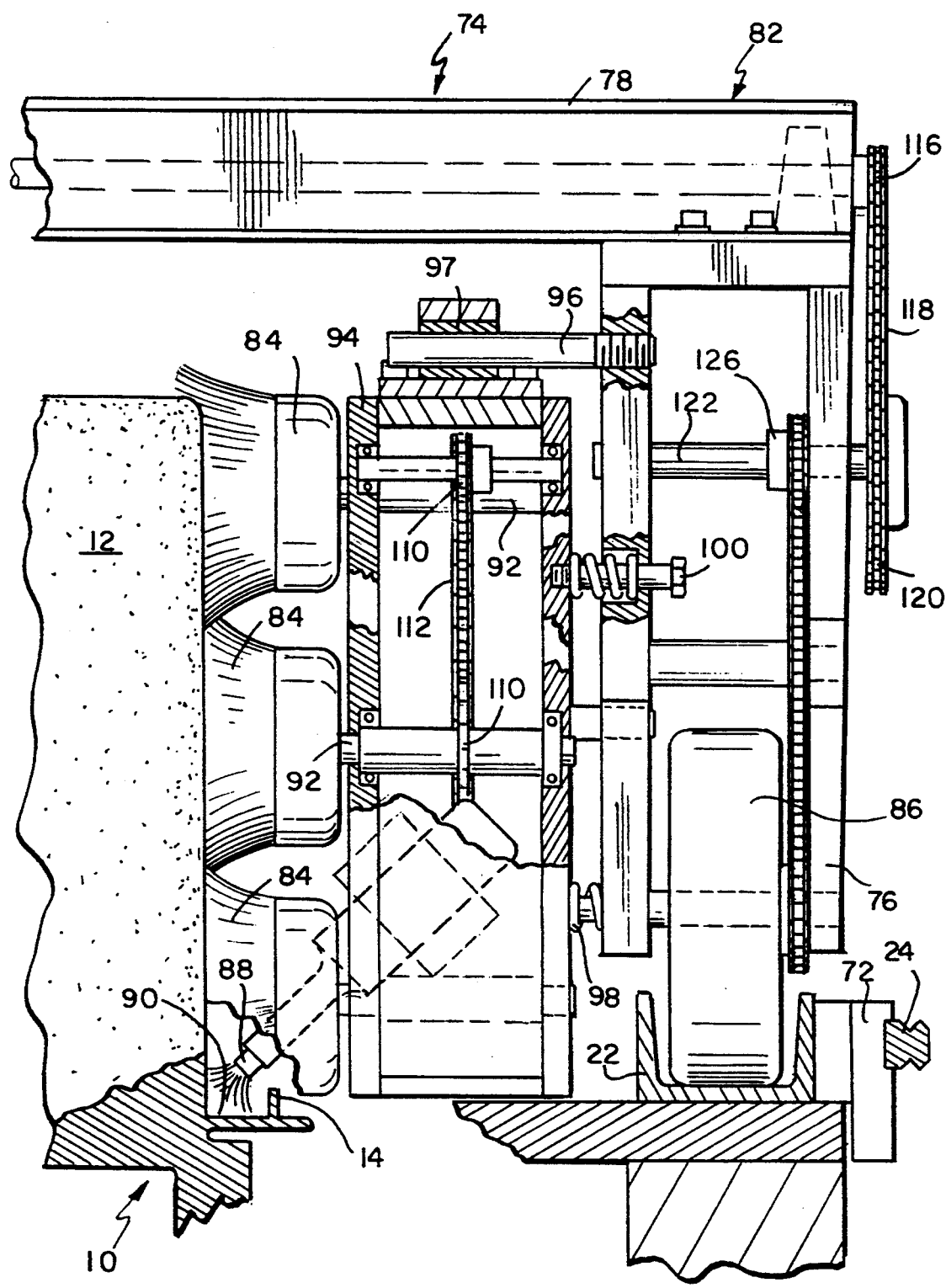
FIG. 5 is a partial view of the descaling machine looking parallel to the longitudinal axis of the door, showing the brushes in position against the coke oven door and the wheels positioned in the U-shaped rail.

As seen in FIG. 5, the brushes 84 are coupled to a chassis 94 that is free to "float" between the vertical support members 78 and the refractory 12. The brushes 84 are coupled to shafts 92 which lie coaxially with the rotational axis of the brushes 84. Bearings 97 are mounted on a movable chassis 94 and slidably engage studs 96. The studs 96 threadingly engage the vertical support members 78. Springs 98 bias the chassis 94 and brushes 84 toward the refractory 12 to ensure adequate contact between the brushes 84 and the refractory 12 to remove the deposits from the door 10. Thus, the movable chassis 94 is free to "float" on the studs 96 between the vertical support members 76 and the refractory 12. Adjusting screws 100 limit the amount of movement of the chassis 94 and brushes 84 relative to the vertical support member 76. FIG. 5 also shows the separate motor driven brush 88 coupled to the chassis 94 for removing deposits from the surface portion 90 of the door frame 15 extending between the knife edge 14 and the refractory 12.

Figure 6:
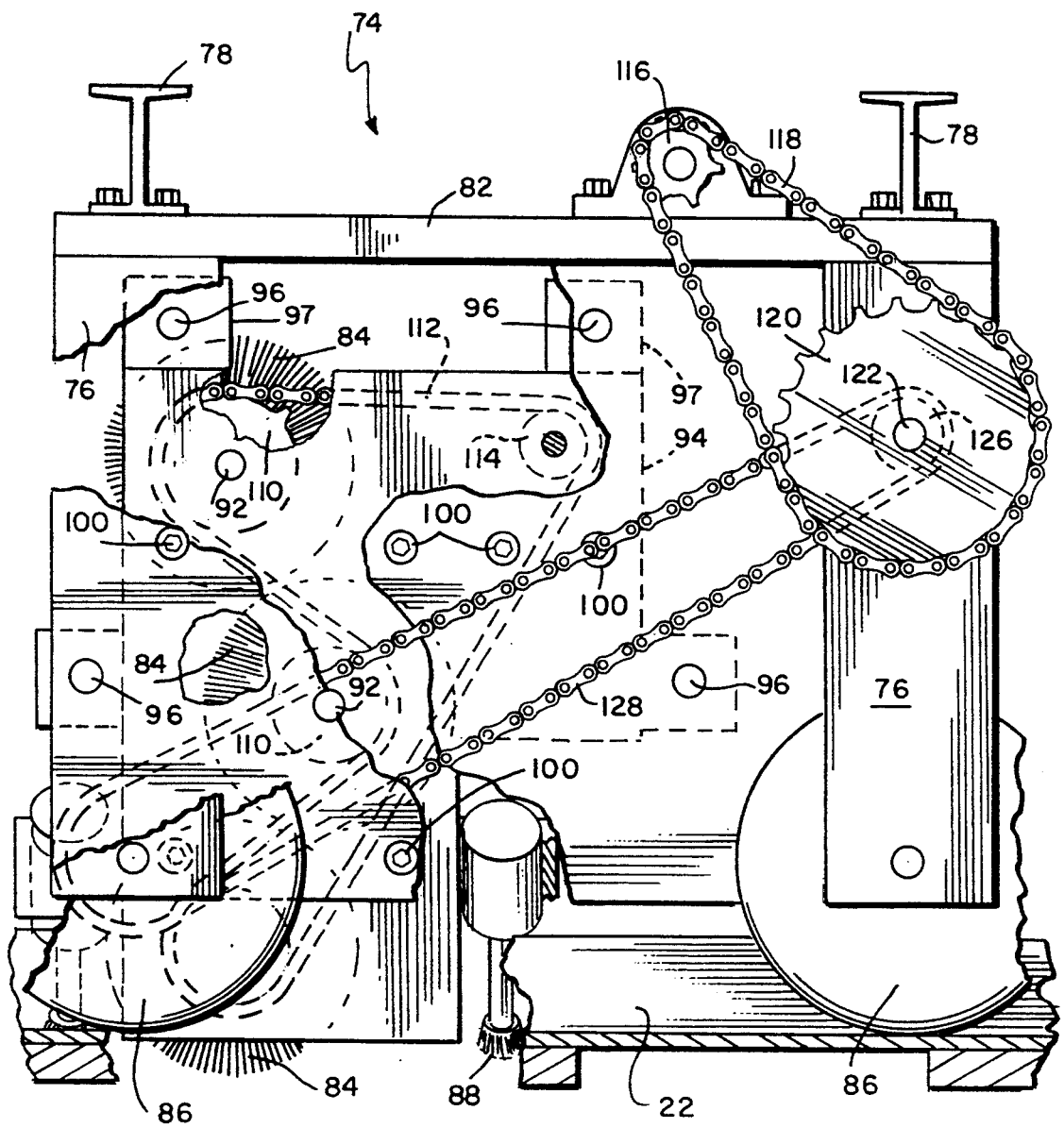
FIG. 6 is a partially broken away side view of the descaling machine as seen from the right in FIG. 4, showing the mechanisms for driving the rotary brushes and moving the descaling machine along the door frame.

As seen in FIG. 6, a first motor-driven drive sprocket 114 rotates the brushes 84. A driven sprocket 110 is rigidly attached to each brush shaft 92. An endless chain 112 is reeved around the sprockets 110 and around the motor-driven drive sprocket 114. As the first motor-driven drive sprocket 114 is rotated by a motor (not shown), a counter-rotating motion is imparted to the brushes 84 via the endless chain 112.

A second motor-driven drive sprocket 116 drives the wheels 86. The second motor-driven drive sprocket 116 is coupled by an endless chain 118 to an intermediate driven sprocket 120. The intermediate driven sprocket 120 is coupled to a shaft 122 which in turn is coupled to the vertical support member 76. The shaft 122 drives a second intermediate driven sprocket 126, which is coupled by endless chain 128 to wheel 86. Thus, as the second motor-driven drive sprocket 116 is turned by a motor (not shown), the sprocket 116 drives the wheels 86 to move the descaler 74 along the door 10 in the U-shaped channel 22.

In operation, the motor-driven sprockets 114 and 116 cooperate with the "floating" chassis 94 to impart a counter-rotating motion to the brushes 84 while maintaining the brushes 84 in contact with the refractory 12 as the descaler moves longitudinally along the door.

Although the invention has been described in detail with reference to a certain preferred embodiment, variations and modifications exist within the scope and spirit of the invention as described and defined in the following claims.

I claim:

1. A device for preparing a coke oven door seal, the device comprising:
   a longitudinally extending coke oven door having a center refractory portion and a door seal extending about the perimeter of the door to engage a door jamb on the coke oven, said seal enclosing the center refractory portion;
   a maintenance frame adapted for holding the door in a stationary position;
   milling means for machining the door seal, said milling means having a gantry coupled to the maintenance frame for positioning the milling means in a milling position relative to the door seal, said milling means being movable vertically, longitudinally, and transversely relative to the door to track the door seal about the perimeter of the door and to maintain the milling means in a milling position relative to the seal; and
   drive means for movably coupling the milling means to the maintenance frame, the drive means including rail means for guiding the gantry and a rack coupled to the maintenance frame and bearing means for coupling the gantry to the rail means and a pinion coupled to the gantry for engaging the rack and moving the gantry along the rail means.

2. The device of claim 1, further comprising means for cleaning the center refractory portion of the door and means for guiding the cleaning means along the door, the cleaning means being coupled to the maintenance frame for longitudinal movement along the door.

3. The device of claim 2, wherein the cleaning means includes a descaler coupled to the maintenance frame and the guiding means includes a U-shaped channel attached to the maintenance frame.

4. A device for preparing a coke oven door seal, the device comprising:
   a longitudinally extending coke oven door having a center refractory portion and a door seal extending about the perimeter of the door to engage a door jamb on the coke oven, said seal enclosing the center refractory portion;
   a maintenance frame adapted for holding the door in a stationary position;
   milling means for machining the door seal, said milling means having a gantry coupled to the maintenance frame for positioning the milling means in a milling position relative to the door seal, said milling means being movable vertically, longitudinally, and transversely relative to the door to track the door seal about the perimeter of the door and to maintain the milling means in a milling position relative to the seal; and
   drive means for movably coupling the milling means to the maintenance frame, said drive means including rail means coupled to the maintenance frame, the gantry being movably coupled to the rail means and, wherein the rail means includes a linear motion rail coupled to the maintenance frame and linear bearings coupled to the gantry for slidably engaging the linear motion rail and the drive means further includes a rack coupled to the maintenance frame and a pinion coupled to the gantry for engaging the rack and moving the gantry along the linear motion rail.

5. A device for preparing a coke oven door, the door having a longitudinal axis, a refractory and a door seal, the device comprising:
   a maintenance frame adapted for securing the door in a working position;
   a milling machine adapted to be coupled to the maintenance frame and having a milling head for machining the door seal;
   a descaling machine adapted to be coupled to the maintenance frame and having a plurality of brushes for removing deposits from the refractory;
   first means for moving the milling head relative to the door seal to maintain the milling head in position adjacent the door seal, the first means for moving including a rack attached to the maintenance frame and a driven pinion attached to the milling machine for engaging the rack and moving the milling machine along a first rail;
   a second means for moving the descaling machine along the door, the second means for moving including a plurality of driven wheels rotatably coupled to the descaling machine for rotatably engaging a second rail; and
   means for coupling the milling machine and the descaling machine to the maintenance frame, the coupling means including a first rail attached to the maintenance frame for guiding the milling machine parallel to the longitudinal axis of the door and a second rail attached to the maintenance frame for guiding the descaling machine parallel to the longitudinal axis.

6. In combination with a coke oven door having a door seal about its perimetral edge for sealably engaging a coke oven, a device for preparing the coke oven door seal, the device comprising:
   a maintenance frame adapted for holding the door in a stationary position with the seal facing upwardly;
   milling means for machining the door seal, the milling means being movable up and down, longitudinally, and transversely relative to the door, the milling means including a cutting tool coupled to the gantry means;
gantry means coupled to the maintenance frame for positioning the milling means in a milling position relative to the door seal, the gantry means including means for driving the cutting tool for movement along the door seal; and
drive means for movably coupling the gantry to the maintenance frame, the drive means including a linear motion rail coupled to the maintenance frame and to the gantry means, a rack coupled to the maintenance frame, and a pinion coupled to the gantry means for engaging the rack and moving the gantry means along the linear motion rail.

* * * * *